(No Model.)

H. F. CAMPBELL & G. H. MILLS.
DEVICE FOR SUPPORTING SAWS WHILE BEING GROUND.

No. 326,397. Patented Sept. 15, 1885.

Witnesses.
F. A. Merrill
A. M. Johnson

Inventors.
H. F. Campbell
George H. Mills
per J. B. Thurston
Attorney

United States Patent Office.

HENRY F. CAMPBELL AND GEORGE H. MILLS, OF CONCORD, N. H.

DEVICE FOR SUPPORTING SAWS WHILE BEING GROUND.

SPECIFICATION forming part of Letters Patent No. 326,397, dated September 15, 1885.

Application filed June 13, 1885. (No model.)

*To all whom it may concern:*

Be it known that we, HENRY F. CAMPBELL and GEORGE H. MILLS, citizens of the United States, residing at Concord, in the county of Merrimac and State of New Hampshire, have invented certain new and useful Improvements in Devices for Supporting Saws while Grinding the Same, of which the following is a specification.

Our invention relates to improvements in machines designed for sharpening most any saws, other than circular saws, by means of an emery-wheel.

Heretofore inventions of this character which have been possessed of practical merit have been rather too cumbersome to meet with popular favor, and too expensive of construction to meet the public demand.

The object of the present invention is to overcome the foregoing defects and objections.

Our invention consists of a suitable bed-plate, which may be made oblong, so as to be less weighty. This bed-plate is adapted to carry a rod or shaft running longitudinally therewith and elevated five inches, more or less, upon which is mounted a sliding carriage provided with a central screw-stud projecting upward and passing through a slot formed in the adjustable saw-rest, and thence through a slot formed in the adjustable back-rest, both said rests being clamped upon the carriage by a suitable thumb-screw threaded to the said screw-stud.

Our invention further consists of a sleeve mounted between the bearings of the sliding carriage and splined to said longitudinal shaft, and certain mechanism applied thereto, whereby the sliding carriage may be secured in a level position, or at any angle required.

Figure 1:
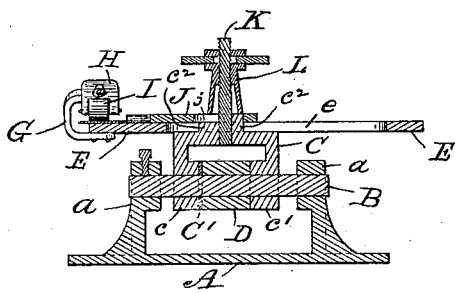
Figure 2:
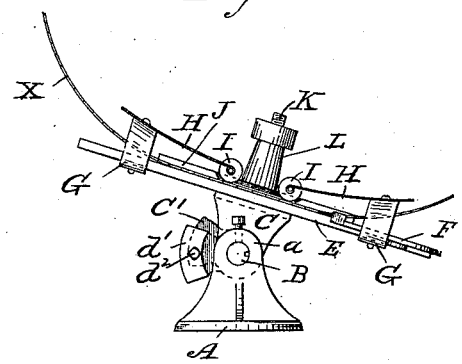
Figure 3:
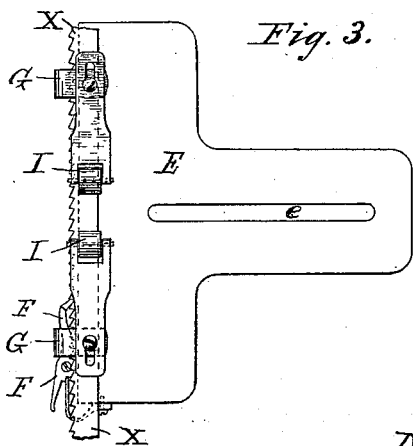
Figure 4:
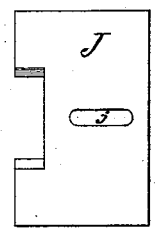
Figure 5:
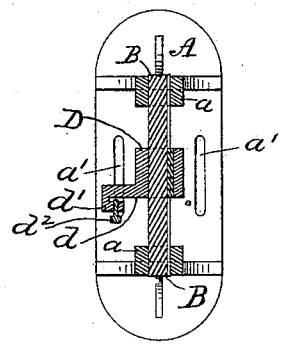
Figure 6:
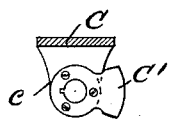

In the drawings forming part of this specification, Figure 1 is a longitudinal sectional elevation of the machine complete. Fig. 2 shows a front elevation of the device, having the sliding carriage tipped on an angle. Fig. 3 is a general plan view of the saw-rest as detached from the machine. Fig. 4 is a detached plan view of the adjustable back-rest. Fig. 5 is a sectional plan of Fig. 2 taken through the bearings. Fig. 6 is a sectional elevation of the inside of the front end of the sliding carriage.

The bed-plate A is provided with elevated bearings $a$, in which a rod or shaft, B, is placed. Upon this shaft B is mounted a sliding carriage, C, by means of suitable bearings, $c\ c'$. Between said bearings and upon said rod is also mounted a sleeve, D, which is splined thereto, as seen best in Fig. 5. Thus, while the carriage C is permitted to cant or tilt to either side while traversing said rod, said sleeve will be prevented such motion. Upon that end of said sleeve D nearest to the bearing $c$ of said carriage is formed a laterally-projecting arm, $d$, having a boss, $d'$, projecting at right angles therefrom. This boss $d'$ is slotted, as seen in Fig. 5, and provided with a set-screw, $d^2$, which enters said slot at right angles therewith.

Upon the inside of the bearing $c$ of the sliding carriage C is placed a suitable plate-piece, C', which is preferably formed as shown in Figs. 2 and 6, and when said carriage is in its position upon the rod B this piece C' enters the slot formed in the boss $d'$, by which construction the carriage C may be placed in a level position, or canted, as seen in Fig. 2, and so be retained firmly by means of the set-screw $d^2$ while traversing said rod.

The saw-rest E is one-half inch, more or less, in thickness, and for the purpose of economy in weight is most conveniently made of T form, as shown in plan, Fig. 3. This is provided on its front edge with a spring-pawl, F, adapted to engage in the teeth of a saw, X, so as to prevent the operator from moving a saw more than one tooth at one time.

U-shaped arms G are screwed or riveted to the front of the rest E; on the under side thereof, as shown in Fig. 1, and upon their tops are placed the spring-levers H, rendered adjustable thereon by means of slots, through which fastening-screws are passed and threaded in said arms, as seen in Fig. 3. The free ends of said levers are adapted to carry the friction-rolls I, which hold the saw down firmly while being ground.

A back-rest, J, is provided on the top of the saw-rest E, and each is provided, respectively, with the slots $j$ and $e$, which fit over the tongue $c^2$ and screw-stud K of the sliding carriage, and said saw-rest and back-rest are securely clamped in position by means of the thumb-nut L, as seen in Figs. 1 and 2. By this means the saw-rest E and back-rest J are capable of longitudinal adjustment upon the said carriage, which is very desirable in the case of the former when changing an emery-wheel for one of either a larger or smaller diameter, and in case of the latter when grinding different widths of saws.

When sufficient adjustment cannot be obtained by shifting the saw-rest, the bed-plate may then be shifted by means of the slots $a'$, through which fastening-bolts are passed, which enter the stand, bench, or table upon which the device is placed.

Having described our invention, what we claim as new, and desire to secure by Letters Patent, is—

1. In a device for supporting saws while being ground upon an emery-wheel, the combination of a saw-rest, E, and back-rest J, provided, respectively, with slots $e\ j$, with a suitable carriage for supporting the same, an oblong tongue, $c^2$, projecting from the top thereof and entering the slots $e\ j$ of the rests E J, a screw-stud, K, projecting vertically from said tongue $c^2$, provided with a thumb-nut, L, and a suitable bed upon which said carriage may be mounted, for the purpose set forth.

2. The combination of a saw-rest, E, and back-rest J, provided, respectively, with slots $e\ j$, with a sliding carriage C, an oblong tongue, $c^2$, projecting from the top thereof and entering the slots $e\ j$ of the rests E J, a screw stud, K, projecting vertically from said tongue $c^2$, provided with a thumb-nut, L, a suitable bed upon which said carriage may be mounted, and means, substantially as shown, whereby said carriage may be retained firmly in either a canted or level position, as and for the purpose set forth.

3. The combination of a bed-plate, A, a rod, B, supported thereon, a carriage, C, and sleeve D, mounted upon said rod, the latter being splined thereto, and means whereby said carriage may be held canted or in a level position and still be capable of a reciprocal movement upon said rod, an adjustable saw-rest, E, having the arms G, spring-levers H, and friction-rolls I secured thereto, an adjustable back-rest, J, a screw-stud, K, and thumb-nut L, by which the rests E J are secured to the carriage C, all constructed and operating substantially as and for the purpose specified.

4. In a machine constructed substantially in the manner described, the combination, with an adjustable saw-rest, of suitable friction-rolls adapted to bear on a saw being ground and mounted upon spring-levers adjustably secured upon suitable arms attached to said saw-rest, all constructed and operating as and for the purpose specified.

In testimony whereof we affix our signatures in presence of two witnesses.

HENRY F. CAMPBELL.
GEORGE H. MILLS.

Witnesses:
J. B. THURSTON,
F. A. MERRILL.